(12) United States Patent
Kujala et al.

(10) Patent No.: US 7,822,001 B2
(45) Date of Patent: Oct. 26, 2010

(54) ADDRESSING AND ROUTING IN WIRELESS MESH NETWORKS

(75) Inventors: Jouni Kujala, Tampere (FI); Timo Koskiahde, Tampere (FI)

(73) Assignee: Nokia Corporation, Espoo (FI)

( * ) Notice: Subject to any disclaimer, the term of this patent is extended or adjusted under 35 U.S.C. 154(b) by 1259 days.

(21) Appl. No.: 10/495,476

(22) PCT Filed: Dec. 3, 2001

(86) PCT No.: PCT/EP01/14119

§ 371 (c)(1), (2), (4) Date: May 13, 2004

(87) PCT Pub. No.: WO03/049405

PCT Pub. Date: Jun. 12, 2003

(65) Prior Publication Data

US 2004/0264451 A1    Dec. 30, 2004

(51) Int. Cl.
*H04W 4/00*    (2009.01)
(52) U.S. Cl. ............ 370/338; 370/389; 370/398; 370/399; 370/351; 370/469
(58) Field of Classification Search ........... 455/428, 455/432.1, 432.2, 414.1, 449, 445; 370/389, 370/395.5, 401, 338, 328, 398, 399, 351, 370/469
See application file for complete search history.

(56) References Cited

U.S. PATENT DOCUMENTS

| | | | | |
|---|---|---|---|---|
| 4,939,726 A | * | 7/1990 | Flammer et al. | 370/400 |
| 5,115,433 A | * | 5/1992 | Baran et al. | 370/400 |
| 6,640,087 B2 | * | 10/2003 | Reed et al. | 455/11.1 |
| 7,139,833 B2 | * | 11/2006 | Heller | 709/238 |
| 2002/0161918 A1 | * | 10/2002 | Asano et al. | 709/238 |

FOREIGN PATENT DOCUMENTS

| | | |
|---|---|---|
| EP | 1 134 940 A1 | 9/2001 |
| GB | 2354912 | 4/2001 |

(Continued)

OTHER PUBLICATIONS

Gorokhov, P.K., "*Explanatory Dictionary on Radio Electronics*", 1993, p. 175.

(Continued)

*Primary Examiner*—Ajit Patel
*Assistant Examiner*—Khai M Nguyen
(74) *Attorney, Agent, or Firm*—Mintz, Levin, Cohn, Ferris, Glovsky, and Popeo, P.C.

(57) ABSTRACT

The present invention is directed to a method and apparatus for forwarding and/or addressing a packet in a wireless network, wherein an address information of a protocol layer lower than a network layer is added to the packet, which address information indicates the geographical location of a destination node and which can be changed during forwarding of the packet through said wireless network. The packet is then forwarded within the wireless network based on a difference between the geographical location of a present node and the destination node. This location based addressing makes packet forwarding easier in dynamic mesh networks, because each node (10) can decide into which direction to forward incoming packets based only on the information in the packet header and its own location.

18 Claims, 3 Drawing Sheets

FOREIGN PATENT DOCUMENTS

| | | | |
|---|---|---|---|
| GB | 2354912 A * | 4/2001 | |
| JP | 1023647 | 1/1989 | |
| JP | 8265844 | 10/1996 | |
| JP | 2001060971 | 3/2001 | |
| RU | 2120190 | 10/1998 | |
| RU | 2140132 | 10/1999 | |
| WO | WO 95/28780 | 10/1995 | |
| WO | WO 0174017 | 10/2001 | |

OTHER PUBLICATIONS

Gorokhov, P.K., "*Explanatory Dictionary on Computer engineering and Programming*", 1988, p. 149.

* cited by examiner

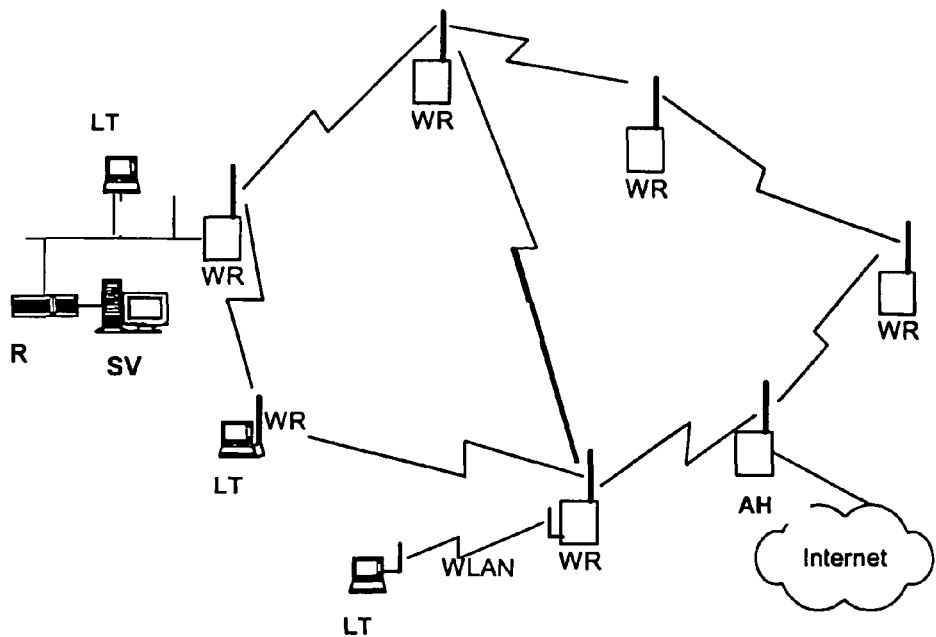
Fig. 1
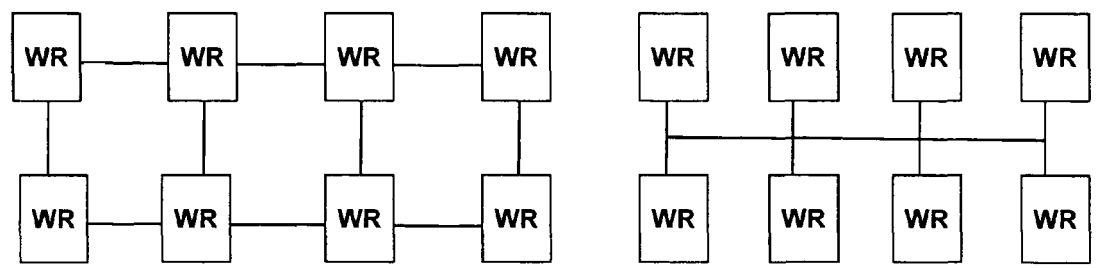
Fig. 2A                    Fig. 2B

ADDRESSING AND ROUTING IN WIRELESS MESH NETWORKS

FIELD OF THE INVENTION

The present invention relates to a method and apparatus for addressing and/or routing in a wireless mesh network.

BACKGROUND OF THE INVENTION

Wireless broadband networks make high performance Internet access possible where wired broadband infrastructure is impractical. However, such a wireless broadband network will only be a success especially for residential and small business markets if the infrastructure is provided at a low cost, is robust to changing environments, easy to deploy and scalable with market demand.

New wireless networks with wireless routers as network nodes on a mesh network basis emulate the topology and protocols of the Internet but are optimized for wireless high-speed data transmission. Such mesh network consists of wireless routers connected to each other with radio links. The radio links are able to arise and break down and the network is able to adjust itself to the current condition of the radio links. Also individual devices can be switched on and off without disturbing the network functionality excessively. The routing protocol keeps track of the whereabouts of the nodes in the network thus making it possible to route packets between distant nodes using the other nodes in the network as an intermediate nodes. Currently there exists several routing protocols that can be used in mobile mesh environment.

The routing protocols are able to handle small amounts of mobility. Still, problems arise when the majority of nodes are mobile, because every node has to know whereabouts of every other node in some extent. This becomes a more serious problem when mesh networks get larger because the changes in the network structure have to be informed to bigger amount of nodes and because the number of changes in the network is of course the higher the bigger the network is. Also the routing tables get bigger and bigger if the mesh gets larger because the routes in the network cannot be aggregated in the same way as in traditional wired networks.

FIG. 1 shows a wireless mesh network (WMN) comprising several wireless routers WR connected via radio links. Not all wireless routers WR hear each other. Hence, packets between two wireless routers WR in the same WMN might have to be forwarded via several wireless routers WR and wireless links before reaching the destination. A wireless router WR can also have other interfaces than those to the mesh network, e.g. WLAN, Ethernet and/or Bluetooth interfaces, to which other network devices are connected. Furthermore, there may also exist routers having other sub-networks with laptops LT, wired routers R and servers SV. One or more of the wireless routers WR may act as an AirHead AH arranged to connect the WMN to other larger networks, e.g. to the Internet. Terminals such as laptops LT may also include wireless router functionality, i.e. they may act as a part of the WMN.

WMNs suffer from constantly changing conditions, which cause links to fail and reborn according to the current conditions. They may not have any specific administrator to take care of the networks, which means that they have to be self-organizing and self-healing. In WMNs, the wireless routers WR can also move, which means that the network structure is changing all the time.

Currently, the existing mesh networks are quite static with mostly fixedly mounted wireless routers WR, but in the near future also cars, trains, buses and other public transport devices may join the WMNs. In the wildest visions, all the people walking on the streets have their own small wireless router WR in their pocket and the whole network consists of these privately owned devices. In this kind of situation, the network structure is changing really fast and there is no way of keeping track of the exact location of every device. Also the size of the WMN in both the number of wireless routers WR and the surface area may be quite huge. In extreme cases one WMN may cover the whole world. This means that the methods proposed to be used in future WMNs have to be as scalable as possible so that they can be used efficiently no matter how large the networks will be. The large address space of the new Internet Protocol version 6 (IPv6) makes it possible to use the IP protocol in this new environment. However, because the IP addresses of the routers cannot be changed on the fly easily without breaking the connections, this is not an optimal solution for the mobile wireless networks. The address changing on-the-fly would be needed in order to preserve the route aggregation in the IP networks.

New routing protocols have been developed especially for wireless networks with no fixed topology. These protocols try to decrease the amount of the routing traffic needed by not telling other nodes about the less important changes in the network structure. However the location of other nodes has to be known to some extent in order to be able to forward the traffic to the right direction. These protocols work quite fine when the network structure remains the same and only the radio quality of the links changes a little. But when the routers start to move, the usable network capacity collapses because of the routing protocol updates and the packets not finding their destinations.

The mobile IP protocol solves the terminal mobility problems that are caused by mobile terminals changing their location in the network. It changes the mobility problem into a routing problem hence not solving the mobility problems in the wireless mesh networks, where also the routers are able to move and where the main problems are actually in the routing area.

Furthermore, traditional MAC (Medium Access Control) switching in fixed wired networks is based on learning the MAC addresses from the source MAC addresses of the packets coming in from an interface. It also requires that broadcast and multicast packets have to be repeated to every link. This method works fine in the traditional fixed wired networks, but in WMNs it cannot be used, because of the different network structure and the network capacity wasted because of the broadcasts.

SUMMARY OF THE INVENTION

It is therefore an object of the present invention to provide a method and apparatus for providing an addressing and/or routing function in dynamic wireless mobile mesh networks.

Accordingly, a location based lower level (e.g. link layer, layer 2, or MAC layer) addressing is provided which is quite handy in networks with mesh-topology where the routing nodes are also capable of moving. The location based addressing makes packet forwarding easier in the network because each node can decide into which direction to forward incoming packets based only on the information on the packet header and their own location. This means that nodes do not need to maintain big routing tables and make time-consuming searches to those tables that are going to be really huge in big mesh networks. It is thus possible to change the addresses based on global position on the fly without breaking the connections and/or causing tremendous routing information update needs. This is possible because it is not necessary to change the higher layer (e.g. network layer, layer 3 or IP layer) address when the equipment moves inside the mesh, because the packet forwarding in the network is made based on the lower layer addresses. Instead, the lower layer address of the device is changed when it is moving, while the higher layer address is kept unchanged. If the location is changed to another network, higher layer methods, such as Mobile IP, can be used.

Location based lower layer addressing also makes it possible to carry out the packet forwarding in mesh networks on link layer, which is simpler and faster compared to the situation where every packet has to be processed on the higher layer.

With this method the routing information needed to be exchanged in the network is minimized. This means that when the equipment is switched on, it can almost immediately start communicating through the network, which is impossible with earlier solutions because the routing tables of other devices have to be updated before that. Also movements of the devices cause less signaling traffic. The signaling traffic is minimized because every node does not need to be informed about the route to every other node.

Advantageous further developments are defined in the dependent claims.

BRIEF DESCRIPTION OF THE DRAWINGS

In the following, the present invention will be described in greater detail on the basis of preferred embodiments with reference to the accompanying drawings, in which:

FIG. 1 shows a schematic representation of a wireless mesh network;

FIG. 2A shows a schematic block diagram of a logical structure of a wireless mesh network with layer 3 forwarding from a layer 3 perspective;

FIG. 2B shows a schematic block diagram of a logical structure of a wireless mesh network with layer 2 forwarding from a layer 3 perspective;

DESCRIPTION OF THE PREFERRED EMBODIMENT

The preferred embodiments of the present invention will now be described on the basis of a WMN as indicated in FIG. 1.

FIG. 2A shows a schematic block diagram of a conventional logical structure of a WMN with network layer forwarding from a network layer perspective. Here, the network layer routing protocols have to provide information required for packet routing inside the WMN, i.e. every wireless router has to know a functional route to every other wireless router. The wireless routers WR are connected together with separated links and the packets are routed between different wireless routers inside the WMN.

FIG. 2B shows a schematic block diagram of a logical structure of a wireless mesh network with link layer forwarding from a network layer perspective, according to the preferred embodiment. Logically, from the network layer perspective, the wireless routers WR form a network in which they are connected together with a single link. Link layer forwarding is much lighter and faster than network layer forwarding if the switching can be implemented with simple enough method. That is why link layer forwarding consumes much less CPU power than network layer forwarding and the cost of the router is reduced considerably.

According to the preferred embodiment, a position or location based link layer addressing (e.g. MAC addressing) and switching can be used in the link layer forwarding to provide a simple addressing and routing method. Such a position-based method may enable faster, simpler and more optimal forwarding, thus reducing the cost of the wireless routers. Basically location based addressing means that the link layer addressing is based on the location of the devices. In other words the link layer address of the device tells its current location on the globe.

Due to the location based addressing at the link layer it can be seen e.g. from the MAC-address where the devices are located related to other devices. When a network device compares the MAC-address of an incoming packet to its own address it immediately knows in which direction the packets destination node is located and it can forward the packet accordingly. So there is no need for big routing tables, because only the addresses of the nearest neighbors have to be known.

Figure 3:
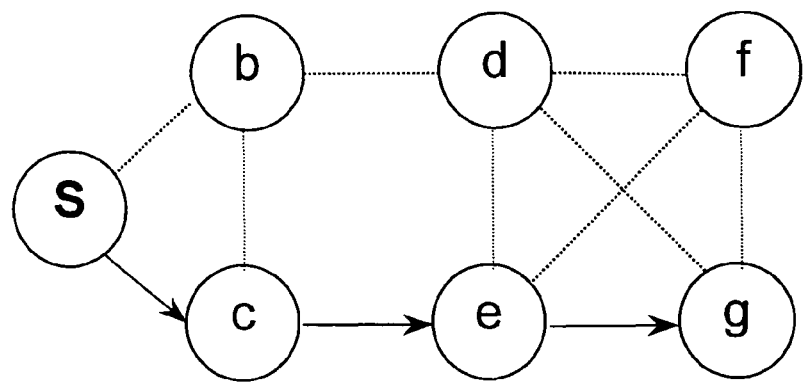
FIG. 3 shows a routing example according to the preferred embodiments.

FIG. 3 shows a routing example according to the preferred embodiments based on an WMN with seven nodes S and b to g. The node S at the left is a source node that wants to send a packet to node g at bottom right corner. The destination MAC-address is marked into e.g. an address field of the packet (e.g. MAC PDU) and thus tells the location of the destination. So, the intermediate nodes c and e do not have to know the topology of the network in order to route the packet to its destination, because they know the geographic location of the destination (from the destination MAC-address) and their own geographic location. Thus, they can route the packet into the right direction and finally the packet arrives at its destination node g.

The addresses used may be globally unique, or they may be unique only on certain area or on certain type of network only. If addresses are unique only on certain area they are all compared to the same fixed point. There may also be different methods how to derive the address from the position. If more than one method is used simultaneously in the same network there has to be a way to define which method is used in which devices.

The location information of a device may be derived using the already existing GPS system or some other known or future positioning or locating techniques, e.g. positioning systems of GSM, which should work somehow even indoors. Other future positioning systems with sufficient accuracy might also be used. Devices can also use the information of the positions of the neighbouring devices and the radio propagation delays to the neighbors when calculating their own location. If the device knows the positions of its three neighbours and the distances to them, it can calculate its own location in two-dimensional space from this information.

The packet forwarding in the WMN can be made using the position based addressing only or together with traditional routing methods combining the benefits of both approaches.

According to the preferred embodiments, packet forwarding or routing is done entirely on layer 2. When a packet arrives to a node the node derives from the destination MAC-address the location of the destination of the packet.

Figure 4:
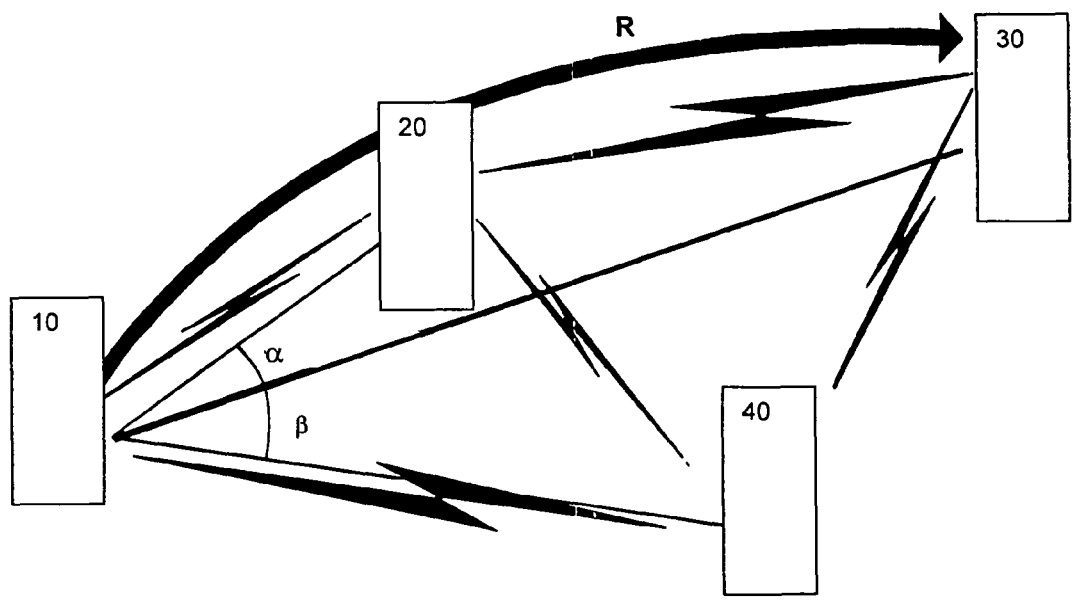
FIG. 4 shows a direction based packet routing according to a first preferred embodiment.

In the first preferred embodiment, the direction of the destination is determined at a node based on its own exact location and the location of the destination. After that, the node forwards the packet to the neighbouring node, which is closest to that direction. Such a direction based routing principle is shown in FIG. 4, where an initial node or wireless router 10 determines or calculates the direction of the destination node 30 from its own position and the position of the destination node, as derived from the corresponding MAC address of the MAC PDU. Then, it calculates the differences α and β between the destination direction and the known directions of neighbouring nodes or wireless routers 20 and 40, respectively. Then, it selects the neighbouring node with the smaller difference and routes the packet to this node, as indicated by the routing paths R in FIG. 4.

Figure 5:
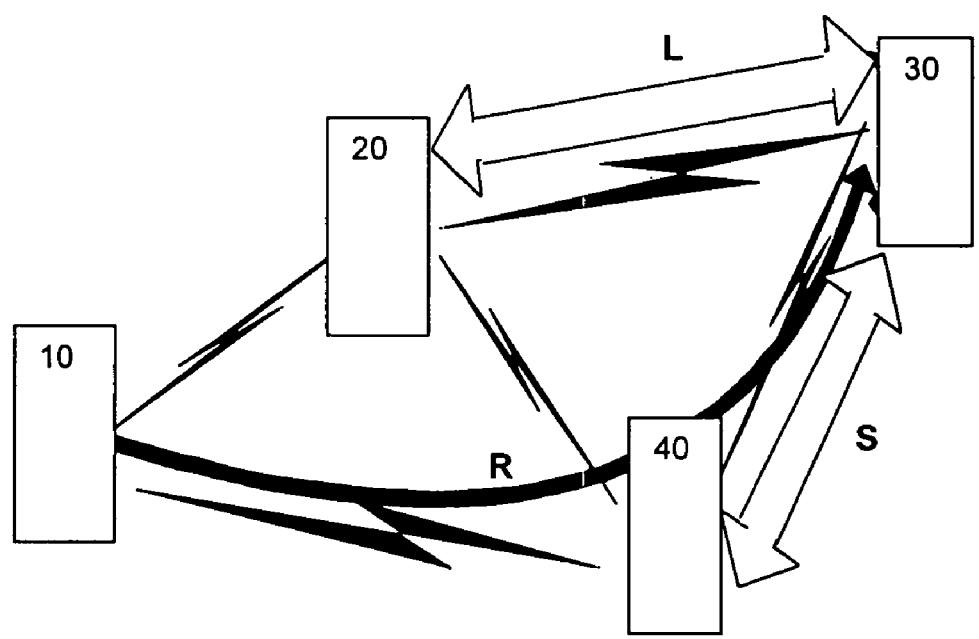
FIG. 5 shows a distance based packet routing according to a second preferred embodiment.

FIG. 5 shows alternative distance based routing, where the source node 10 determines or calculates distances L, S between the destination node 30 and all it's neighbouring nodes 20, 40 based on the derived position of the destination node 30. Then it just forwards the packet to the neighbouring node that is closest to the destination node 30. In the present example of FIG. 5, the distance S between the lower neighbouring node 40 and destination node is smaller, and the routing path R passes through the lower neighbouring node 40.

In some cases the above two alternative methods according to the first and second preferred embodiment may lead to different kinds of behaviour, but in practice the difference should be minimal. The method according to the first embodiment leads to shorter hops thus cutting down the power consumption because of less transmit power needed. The method according to the second embodiment leads to longer hops minimizing the total amount of hops to reach the destination. But it also means that more transmit power is needed reducing the battery life, and other neighbouring devices are also disturbed more because of the higher transmit power used.

It is noted that also other parameters may be taken into account when making the forwarding or routing decision. These may include capacities of the links, bit error ratios, different loads on different links, and so on.

Because addressing is based on the location, the devices have to know their current location all the time. The location information should be accurate enough so that the forwarding is possible with it, but it is not needed to be too accurate either.

Because all the nodes in a network know who their neighbours are, the exact location information is not needed anymore when packets get close enough to their destination. This means that the accuracy needed is the same as the distance of the neighbours. In addition, the accuracy does not need to be even that exact if it has been taken care that it is more accurate when comparing to the neighbours. In other words systematic error in location information is not that critical. Systematic error can occur for example when the location of a device is determined from the locations of the neighbouring devices and from the distances to the neighbours.

Because the MAC-address of a device is based on the location of the device it has to be changed when the equipment moves. The changes in the address have to be told at least to the neighbours of the device so that they can forward the packets destined to the node correctly. This also affects the routing of the other packets. Despite of the change in the address, the node may still receive packets with the old address for some time. Moreover, the nodes with which the node has communicated recently could be informed about the address change in order to avoid packet losses. There should also be specific nodes in the network to whom the MAC-addresses are told and from whom the MAC addresses corresponding to certain IP-addresses are asked. In other words there should be nodes acting as an neighbour discovery cache. So, one (the nearest) of these specific nodes is to be informed about the address change, after which the others can get the information from this specific node.

The address change is actually needed only when it has a significant effect on routing. This means that if the moving node does not pass any other nodes, the movement does not have very much effect on the routing. Actually, the system may be designed so that the neighbouring nodes know the locations of the node more precisely than the other nodes in the network and the forwarding decision could be done according to this information. The MAC address would be used only when making routing decisions more far away from the node and therefore MAC address has to be changed only when the neighbourhood changes (node passes other nodes, new neighbours found). Nodes that are moving with constant speed may also predict their future movement and start the address change process in advance.

The packet is switched through the network until it reaches its destination or the switching algorithm can not conclude where to send the packet next. In these situations the packet is passed to the upper protocol layer (network layer), which then decides what to do with the packet. The situations where the switching algorithm has to pass the packet to the upper layer and the operations performed by the node if the packet did not reach the destination with the normal forwarding methods are defined in the following.

The packet that reached its destination in the link layer is processed according to the normal router operation at the IP level. The link layer destination is not of course necessarily the destination of the IP packet but can be a router in the middle of the route in the network. If the source and the destination of the received IP packet are at the same network, the packet is normally forwarded and also a (ICMP/neighbour discovery protocol) redirect message may be used to tell the source to send the packet directly to the MAC address of the destination.

There are at least three situations where the switching algorithm fails to deliver the packet to its destination and where the packet has to be passed to the upper layer:

1) the destination does not exist,
2) it cannot be heard because of a radio interference, or
3) there is no direct route to the destination.

The switching algorithm can detect these situations from two indications:

1) the packet is coming from an interface to which it should be sent according to the switching algorithm, or
2) the wireless router can hear another wireless router located behind the destination wireless router but it cannot hear the destination itself.

MAC address resolution can be done in IPv4 and IPv6 networks by using the Address Resolution Protocol and the Neighbour Discovery Protocol, respectively. In the WMNs, these protocols consume too much bandwidth because of their broadcast and multicast MAC address usage. That is why these packets may only be delivered to certain selected nodes, which then proxy the information to the ones that requested it. The node, that relays the multi- and broadcast packets to the selected node, may also intercept the packets and act as a proxy for a while. The selected nodes then keep the information up-to-date between themselves. If these selected nodes are connected to some core network, it can be used for information updating instead of the WMNs. Other protocols that use multi- and/or broadcast messages may also be implemented by using the method described above. If a node changes its location inside the WMN and its GPA based MAC address changes, it reports the new MAC address to a selected node and/or also to all the other nodes it has communicated recently with inside the WMN, and/or to any other network node. Because the MAC address of a node may change in the WMN frequently, the MAC addresses of the nodes can not be cached for a long time by the other nodes. A node should accept packets coming with the old MAC address(es) as long as the other nodes might cache the address. Of course if a node changes its location quickly enough a packet may not find its destination with the old MAC address. In that case the packets are rerouted to the new location or dropped by the neighbour routers in the previous location or by any other network node. In order to enable the rerouting the node may report its new MAC address also to all the previous neighbours it cannot hear anymore.

It should be noted that the present invention is not restricted to a position based MAC addressing. Implementations of the invention in other systems are also possible, where position or location based changeable addresses can be provided on a lower protocol level, while static or non-changeable addresses can be provided on a higher protocol level.

The invention claimed is:

1. A method, comprising:
adding to a packet an address information of a protocol layer lower than a network layer, the packet comprising an Internet Protocol address and the address information, the Internet Protocol address represents a network layer address, the added address information representing a geographical location of a final destination node to which the packet is to be routed, the added address information is configured to be changed during forwarding of the packet through a wireless network when the geographical location of the final destination node changes; and
forwarding the packet within the wireless network to the final destination node based on the added address information of the lower protocol layer by routing based on a difference between the geographical location of a present node and the final destination node, the Internet Protocol address used to route the packet when the packet reaches at least one of the final destination node or a switching algorithm using the added address information does not yield where to forward the packet, wherein the packet is passed to a higher protocol layer when at least one of the following occurs: the final destination node does not exist within the wireless network, the final destination node cannot be heard, or when there is no direct route within the wireless network to the final destination node, and wherein the network layer is configured to drop the packet, when the packet is passed to the network layer.

2. A method according to claim 1, wherein said difference between said present node and said final destination node is determined by calculating differences between the direction of said final destination node and the directions of neighboring nodes.

3. A method according to claim 1, wherein said difference between said present node and said final destination node is determined by calculating distances between said final destination node and neighboring nodes.

4. A method according to claim 1, wherein said address information is a link layer address.

5. A method according to claim 4, wherein said link layer address is a medium access control address.

6. A method according to claim 1, wherein said network layer is an internet protocol layer.

7. A method according to claim 1, wherein a new lower protocol layer address is reported to neighboring nodes, to nodes which have been communicated to recently and/or any other nodes in the network, when the geographical location of a network node changes.

8. A method according to claim 1, wherein said lower protocol layer address is a location based address.

9. A method according to claim 1, wherein said packet is rerouted or dropped by a neighboring or any other node when an old lower protocol layer address cannot be located anymore.

10. An apparatus, comprising:
a processor configured to add to a packet an address information of a protocol layer lower than a network layer, the packet comprising an Internet Protocol address and the address information, the Internet Protocol address represents a network layer address, the added address information representing a geographical location of a final destination node to which said packet is finally to be routed the added address information is configured to be changed during forwarding of the packet through a wireless network when the geographical location of the final destination node changes; and
a transmitter configured to forwarding the packet within the wireless network to the final destination node based on the added address information of the lower protocol layer by routing based on a difference between the geographical location of a present node and the final destination node, the Internet Protocol address used to route the packet when the packet reaches at least one of the final destination node or a switching algorithm using the added address information does not yield where to forward the packet, wherein the packet is passed to a higher protocol layer when at least one of the following occurs: the final destination node does not exist within the wireless network, the final destination node cannot be heard, or when there is no direct route within the wireless network to the final destination node, and wherein the network layer is configured to drop the packet, when the packet is passed to the network layer.

11. An apparatus according to claim 10, wherein said difference between said present node and said final destination node is configured to be determined by calculating differences between the direction of said final destination node and the directions of neighboring nodes.

12. An apparatus according to claim 10, wherein said difference between said present node and said final destination node is configured to be determined by calculating distances between said final destination node and neighboring nodes.

13. An apparatus according to claim 10, wherein said address information is a link layer address.

14. An apparatus according to claim 13, wherein said link layer address is a medium access control address.

15. An apparatus according to claim 10, wherein said network layer is an internet protocol layer.

16. An apparatus according to claim 10, wherein said apparatus is configured to report a new lower protocol layer address to neighboring nodes, to nodes which have been communicated to recently, and/or any other nodes in the network, when the geographical location of a network node changes.

17. An apparatus according to claim 10, wherein said lower protocol layer address is a location based address.

18. An apparatus, comprising:
adding means for adding to a packet an address information of a protocol layer lower than a network layer, the packet comprising an Internet Protocol address and the address information, the Internet Protocol address represents a network layer address, the added address information representing a geographical location of a final destination node to which the packet is to be routed, the added address information is configured to be changed during forwarding of the packet through a wireless network when the geographical location of the final destination node changes; and forwarding the packet within the wireless network to the final destination node based on the added address information of the lower protocol layer by routing based on a difference between the geographical location of a present node and the final destination node, the Internet Protocol address used to route the packet when the packet reaches at least one of the final destination node or a switching algorithm using the added address information does not yield where to forward the packet, wherein the packet is passed to a higher protocol layer when at least one of the following occurs: the final destination node does not exist within the wireless network, the final destination node cannot be heard, or when there is no direct route within the wireless network to the final destination node, and wherein the network layer is configured to drop the packet, when the packet is passed to the network layer.

* * * * *